(12) United States Patent
Lei

(10) Patent No.: US 6,618,207 B2
(45) Date of Patent: Sep. 9, 2003

(54) ENDOSCOPE LENS, AND AN ENDOSCOPE EQUIPPED WITH SUCH A LENS

(75) Inventor: Fang Lei, Durchhausen (DE)

(73) Assignee: Karl Storz GmbH & Co. KG (DE)

( * ) Notice: Subject to any disclaimer, the term of this patent is extended or adjusted under 35 U.S.C. 154(b) by 0 days.

(21) Appl. No.: 09/883,411

(22) Filed: Jun. 18, 2001

(65) Prior Publication Data

US 2002/0027723 A1 Mar. 7, 2002

Related U.S. Application Data

(63) Continuation of application No. PCT/EP99/10138, filed on Dec. 20, 1999.

(30) Foreign Application Priority Data

Dec. 18, 1998 (DE) .......................................... 198 58 785

(51) Int. Cl.[7] .............................................. G02B 21/02
(52) U.S. Cl. ...................................................... 359/656
(58) Field of Search ................................. 359/656–661

(56) References Cited

U.S. PATENT DOCUMENTS

| | | | | |
|---|---|---|---|---|
| 4,165,917 A | * | 8/1979 | Yamasita et al. ........... 359/784 |
| 4,850,342 A | | 7/1989 | Hashiguchi et al. ........... 128/6 |
| 5,005,957 A | | 4/1991 | Kanamori et al. .......... 350/432 |
| 5,888,193 A | | 3/1999 | Breidenthal et al. ........ 600/160 |
| 5,980,453 A | | 11/1999 | Forkey et al. .............. 600/162 |

FOREIGN PATENT DOCUMENTS

| | | |
|---|---|---|
| EP | 0 571 725 A1 | 3/1993 |
| JP | Heisi 1-114068 | 5/1989 |
| JP | Heisi 2-293709 | 5/1989 |
| JP | 04257504 | 8/1992 |
| WO | WO 00/37988 | 6/2000 |
| WO | A97083 WO | 12/2000 |

* cited by examiner

*Primary Examiner*—Scott J. Sugarman
(74) *Attorney, Agent, or Firm*—St. Onge Steward Johnston & Reens LLC

(57) ABSTRACT

The invention relates to an endoscope lens which shows only a low level of distortion even at large angles of sight and whose elements can be produced and assembled with little effort, consisting of a first lens group having negative total refractive power, of an aperture diaphragm, and of a second lens group having a positive total refractive power, whereby all lens surfaces are spherical and all lenses are made of homogeneous materials. The first lens group contains at least one positive lens which is primarily arranged in the beam direction, and at least one negative lens, whereby the negative lenses in the first lens group are biconcave or plano-concave lenses. The invention also relates to an endoscope equipped with a lens of this type.

18 Claims, 4 Drawing Sheets

ENDOSCOPE LENS, AND AN ENDOSCOPE EQUIPPED WITH SUCH A LENS

CROSS-REFERENCE TO RELATED APPLICATIONS

This application is a continuation of International Application PCT/EP99/10138 file Dec. 20, 1999, which designates the United States. This application claims priority from German Application DE19858785.6 filed Dec. 18, 1998.

FIELD OF THE INVENTION

The invention relates to an endoscope lens in accordance with the general concept of patent claim 1, and to an endoscope with a lens of the same type.

BACKGROUND OF THE INVENTION

Conventional endoscopes have a lens arranged distally which projects an image of the scene to be observed, and an image transmitter which conveys the image projected by the lens from the distal to the proximal end of the endoscope, where it is observed, for instance, by an eyepiece or recorded by a video camera. The image transmitter in these devices generally consists of lens systems, the relay lens systems which form the image in each case from one successive image plane to the next. Endoscope lenses must achieve a very great angle of sight (2w up to 80 degrees), and all lenses must have an equally small diameter so that they can be accommodated within a narrow tube.

Lenses used in known endoscopes consist primarily of two lenses or lens groups which are separated by the aperture diaphragm; here and in the remainder of this text, "aperture diaphragm" shall be understood as also including the image of the aperture diaphragm, since additional reproducing systems are usually added. The first lens or lens group in the beam direction, mounted ahead of the aperture diaphragm, has negative total refractive power in order to achieve the greatest possible image field angle, and usually consists of a single negative lens. Beyond the aperture diaphragm, a second lens group is installed whose total refractive power is positive and which normally consists of several lenses. The aperture diaphragm between the two lens groups is placed in the front focal point of the second lens group, so that the principal beams run on the image side parallel to the optical axis; this is favorable for coupling onto the relay lens systems. The foregoing state of the art is referred to in FIGS. 1 to 3c of U.S. Pat. No. 5,005,957 or the article "Telecentric relay systems having distortion and their application in endoscopes," by Eberhard Dietzsch, SPIE, Vol. 2774 (pp. 276–282).

A disadvantage of the known endoscope lenses described here is the strong, negative, that is, barrel-shaped, distortion that depends on the visual field angle, a distortion that for example reaches values of −20% ... 25% at a visual field angle of 2w=70 degrees ... 80 degrees. It has long been believed—as noted in the second paragraph of the above-cited article—that this distortion of endoscope lenses cannot be reduced, at least, if the lens includes lenses exclusively of the standard technology, that is, with spherical surfaces and constant refractive index.

U.S. Pat. No. 5,005,957 therefore suggests that lenses with aspherical surfaces be used. In this way it is possible to reduce the distortion to a few percentage points. Because aspherical surfaces in many cases can be replaced by lenses of a material with axially varying refractive index, it has also been suggested that the distortion of the known endoscope lenses should be corrected by the use of lenses whose refractive index varies in the axial direction. Both the use of lenses with aspherical surfaces and the use of lenses with varying refractive index result in higher manufacturing costs in comparison with conventional lenses with spherical surfaces and materials of constant refractive index, as well as because of production tolerances of additional image errors on the image periphery.

As the aforementioned article by Eberhard Dietzsch has also shown, it is possible to use asymmetrical relay lens systems whose distortion is opposite to the distortion of the lens, and thus partially corrects it. This solution, however, has the disadvantage that the correction depends on the number of relay lens systems in use and thus on the length of the individual endoscope. Asymmetrical relay lens systems, moreover, are more expensive to produce than the symmetrical ones. Asymmetry, in addition, introduces mainly more image errors such as coma and lateral chromatic error, which are sometimes difficult to correct.

Another approach is taken by JP 60-80816A, according to which at least one positive lens and at least one negative meniscus lens are called for in the first lens group in the beam direction, in order to compensate for the distortion. In accordance with EPO 571 725 A1, the first lens group consists of two meniscus lenses, each having negative refractive power, which in a separate version are cemented together. Lenses that contain meniscus lenses, particularly in the first lens group, have the disadvantage, however, that they are more difficult to center, since the centers of curvature of the two lens surfaces are on the same side of the lens, especially when the two centers of curvature are close together. This is even more true if two or more meniscus lenses are arranged in a row.

Thus the invention is based on the task of providing an endoscope lens which, even at great angles of sight as high as 80 degrees, only have a distortion that cannot be detected by the human eye, whereby the elements of the lens and the endoscope lens itself should be economical to produce and to assemble.

SUMMARY OF THE INVENTION

The invention is based on an endoscope lens with a first lens group in the beam direction having a negative total refractive power, an aperture diaphragm that is installed beyond the first lens group, and a second lens group whose total refractive power is positive and which is assembled beyond the aperture diaphragm. To avoid the expense associated with aspherical lens surfaces or non-homogeneous materials, and the related reproduction errors, only spherical surfaces and only materials with homogeneous refractive index are used.

The contribution of one lens to the total distortion of the lens system is determined by the size and algebraic sign of the refractive power of the lens and by the position of the lens relative to the aperture diaphragm. To compensate for the distortion produced by the known endoscope lens mentioned at the outset, the invention's endoscope lens therefore contains, in the first lens group, which has negative total refractive power, at least one lens with positive refractive power. Here, a positive lens is first installed in the beam direction and at this lens the refractive power and distance from the aperture diaphragm are measured in such a way that the distortion produced by this lens appreciably corrects the negative distortion that the lens system would otherwise have. Since the total refractive power of the first lens group is negative, the first lens group in addition must contain at least one negative lens, whereby the sum of the contributions of the refractive powers of the negative lenses in the first lens group must be greater than the sum of the contributions of the refractive powers of the positive lenses in the first lens group.

The above-mentioned task is fulfilled, therefore, by the invention because the negative lenses in the first lens group are biconcave or plano-concave lenses.

Such lenses are simpler to produce, simpler to center, and simpler to install in the total optical system than the negative meniscus lenses used in known endoscope lens systems. Thus, contrary to the viewpoint cited above and without the costs associated with the known endoscope lens systems, it is possible to construct endoscope lenses of the mentioned type in standard technology in such a way that the distortion of the lens can be reduced to a level that is not perceived as disturbing for the viewer. In particular, the absolute value of the total distortion can thus be reduced to a value of less than 6%, typically even 4% or less.

The determination of the parameters of the lenses, and the adjustment of the other elements of the lens system, proceed, on the basis of the aforementioned specifications, in known manner, with the use of customary optic design software. Surprisingly, it is possible with the invention's solution, not only to reduce the distortion to non-disturbing levels, but also to continue to correct the other image errors as well, and for instance even to improve the solution further. The image field barreling of the lens system can be selected, in known manner, in such a way that it compensates for any image field barreling of the relay lens systems, or the image field of the lens system may also be level.

In an advantageous realization of the invention, the first lens group consists only of two lenses, one of which has positive and the other negative refractive power, whereby the positive lens is installed in the beam direction ahead of the negative lens. In this realization, the lens system is especially simple and economical.

In another advantageous realization of the invention, the positive lens in the first lens group is a biconvex lens, in which the more strongly curved surface is preferably on the image side, or is a plano-convex lens whose convex surface is preferably installed on the image side. As a result, a good correction of the reproduction error is achieved.

In another advantageous realization, the positive lens in the first lens group is cemented with the negative lens. This results in a cemented element, which is particularly simple to maneuver and, contrary to individual meniscus lenses, can also be centered without problems. In this case it is particularly advantageous if the refractive index of the positive lens is greater than that of the negative lens, contrary to the customary proportion with cemented elements. As a result, a particularly good correction of the reproduction error is achieved.

The positive lens may also have an empty space separating it from the negative lens. The space constitutes an additional parameter in the design of the lens system, one that can be used for improving the correction.

It is another task of the present invention to produce an endoscope in which, despite a wide angle of sight, the distortion is so minor that it cannot be perceived by the human eye, whereby the optical elements of the endoscope should be simple to produce and to install.

The invention fulfills this task in that a largely distortion-free eyepiece, an equally largely distortion-free image transmitter, and a lens system are installed in an endoscope in accordance with one of claims 1 to 8.

Distortion-free image transmitters are known, for example symmetrical relay lens systems. Also common are eyepieces that are distortion-free or produce only low levels of distortion; this residual distortion is primarily negative in known eyepieces and thus cannot be compensated by the negative distortion of most of the known endoscope lenses. Because, according to the invention, the three structural components of the optical system of an endoscope are each in their own right, at least to a great extent, corrected to distortion-free status, it is possible to have a correction of the reproduction error that is optimal and valid for various overall lengths and combinations. Because an endoscope lens according to this invention is used, the production expense for the endoscope lens is minor.

The invention's endoscope lens can also be used to good advantage together with a flexible image transmitter or in an endoscope with a distally mounted electronic image receptor. The term "endoscope" is understood here to include also other types of viewing devices such as periscopes.

BRIEF DESCRIPTION OF THE DRAWINGS

In the following, the invention is demonstrated without restriction of its general inventive concept by means of models shown in the sketch, to which we refer explicitly to explain all details of the invention that are not more minutely described in the text. The illustrations are as follows.

DETAILED DESCRIPTION OF DRAWINGS

The figures depict lens sections of the models. In addition, FIGS. 1a and 1c each present three beams (one main beam and two peripheral beams) from several object points outside the visual field, whereas FIG. 1b shows a marginal beam from the center visual field and a main beam from the visual field periphery. In all figures, the surfaces are numbered from 1 upward, with numeration starting on the object side.

In Tables 1a to 1c, numerical data are given for the corresponding models. The figures are partially rounded.

The plane-parallel plate, which is formed from surfaces 1 and 2, is the cover glass that forms protection for the other elements of the lens system.

Figure 1A:
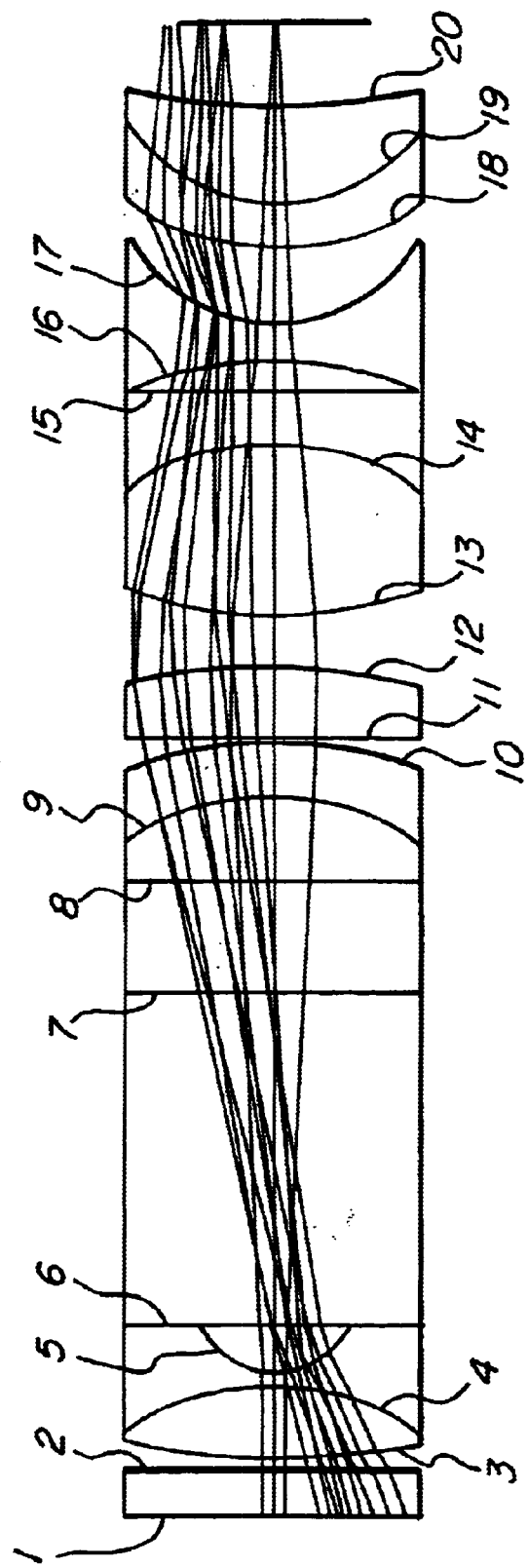
FIG. 1a An initial demonstration of the invention, in which a positive lens for correcting distortion is foreseen in the first lens group.
Figure 1B:
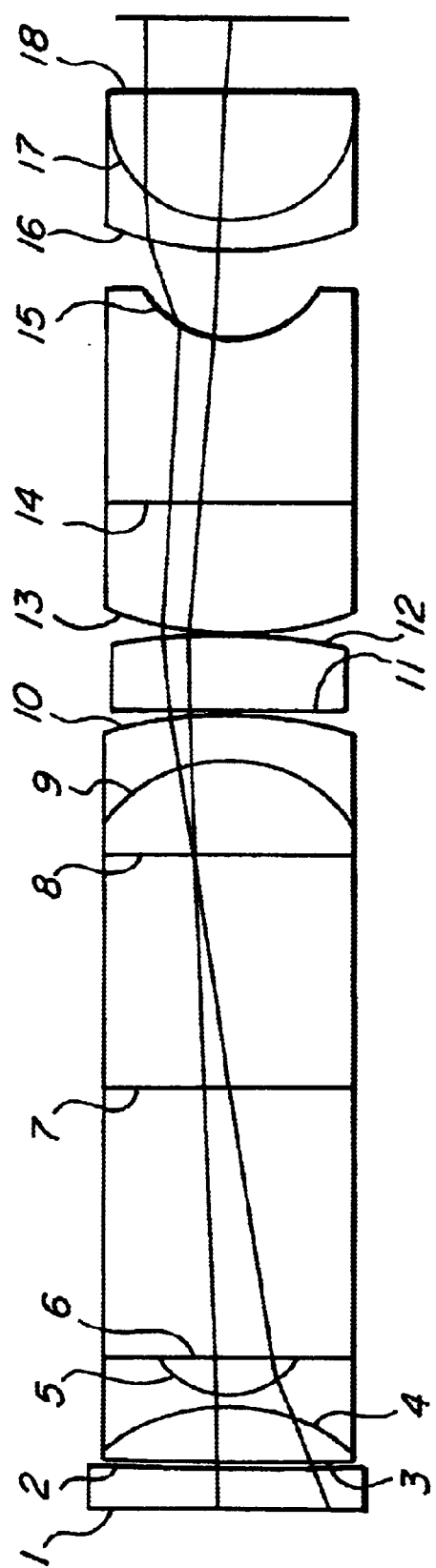
FIG. 1b A modification of this model.

In the model in FIG. 1a the first lens group contains a negative lens (surfaces 4 and 5), which, in order to correct the distortion, is preceded by a positive additional lens (surfaces 3 and 4) that is cemented to a negative lens. The first lens group has a negative refracting power altogether, in order to achieve a large angle of sight. The second lens group consists here of three achromatic lenses (surfaces 8 to 10, 13 to 15, and 18 to 20) and of a positive single lens (surfaces 11 and 12) and a negative single lens (surfaces 16 and 17). The first achromatic lens, the positive single lens, and the second achromatic lens, that is, surfaces 8 to 15, could also be replaced by a single achromatic lens, resulting in somewhat poorer properties. Altogether the second lens group has a positive refracting power. The aperture diaphragm is virtually in the front focal point of the second lens group, that is, here in the second plane-parallel plate (between surfaces 6 and 8), so that the main beams on the image side proceed parallel to the optical axis; the real aperture diaphragm is installed farther behind, in one of the relay lens systems, in such a way that its image falls into the front focal point of the second lens group.

The existing negative single lens (surfaces 16 and 17) in the second lens group serves, as in the aforementioned known lens systems, to correct the various reproduction errors; although it produces positive distortion, this distortion is not large enough to compensate for the negative distortion of the entire system. This purpose is served by the positive lens in the first lens group (surfaces 3 and 4), whose refractive power and distance from the virtual aperture diaphragm are measured in such a way that the distortion of the entire system is practically completely corrected.

The model illustrated in FIG. 1b is constructed in similar manner to that of FIG. 1a, but the second lens group consists of three achromatic lenses (surfaces 8 to 10, 13 to 15, and 16 to 18) and of just one positive single lens (surfaces 11 and 12). The aperture diaphragm is situated in the second plane-parallel plate (surfaces 6 to 8). The construction of the second lens group, modified from that of the model in FIG. 1a, has the advantage of greater simplicity with equally good reproduction quality. A production simplification is achieved by the fact the object-side surface 3 of the positive lens in the first lens group in this model is a plane surface.

Figure 1C:
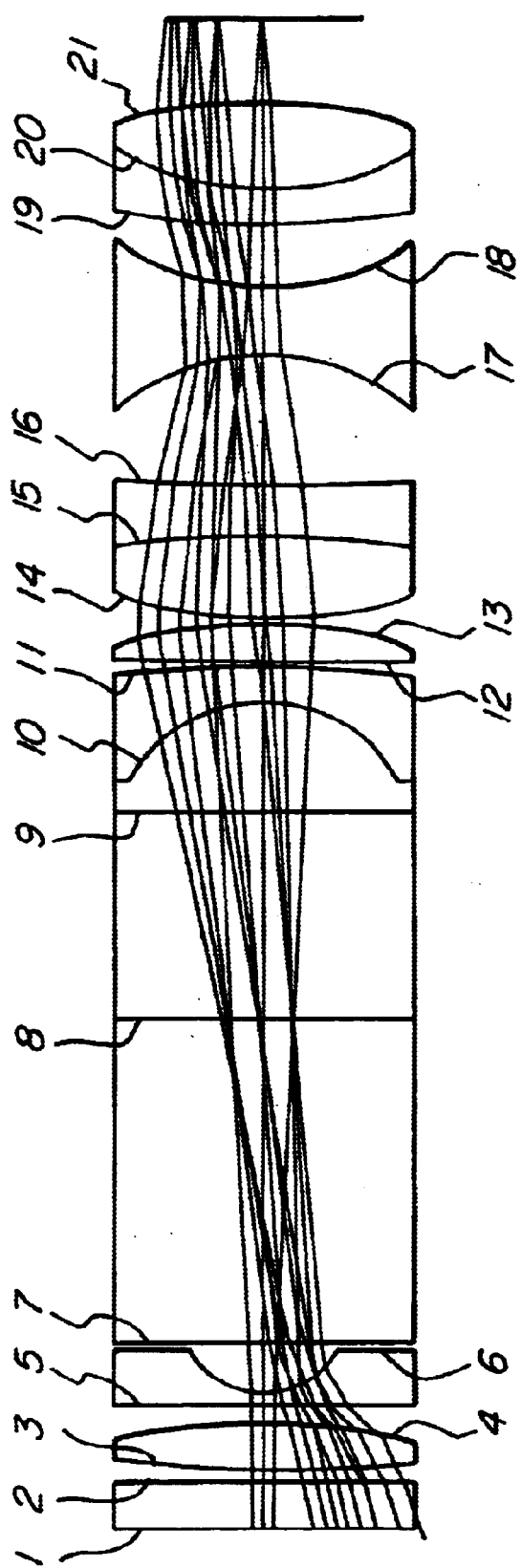
FIG. 1c An additional modification of this model.

The model of FIG. 1c is also similar to that of FIG. 1a in construction, although the positive additional lens inserted to correct the distortion in the first lens group (surfaces 3 and 4) is not cemented with the negative lens of the first lens group (surfaces 5 and 6), but instead is separated from it by a small vacant space. The aperture diaphragm is situated inside the second plane-parallel plate (surfaces 7 to 9). The second lens group, as in model 1a, consists of three achromatic lenses (surfaces 9 to 11, 14 to 16, and 19 to 21) and of a positive single lens (surfaces 12 and 13) and a negative single lens (surfaces 17 and 18), whereby the first two achromatic lenses and the positive single lens (surfaces 9 to 16) could be replaced by a single achromatic lens. The second lens group is adjusted to the first lens group's properties that differ from those of the model of FIG. 1a.

All numerically produced models include a barrel-shaped distortion (negative distortion) of about 4 percent with an angle of sight 2w of about 80 degrees. It is also possible to reduce the degree of distortion, in some cases even to less than 2 percent, by introducing both a positive lens in the first lens group and also an additional single negative lens in the second lens group and adjusting the other elements of the lens system accordingly. A distortion to an extent of 4 percent or less, however, is normally no longer perceived by the human eye. Thus no additional compensation of the distortion is now required.

Figure 2:
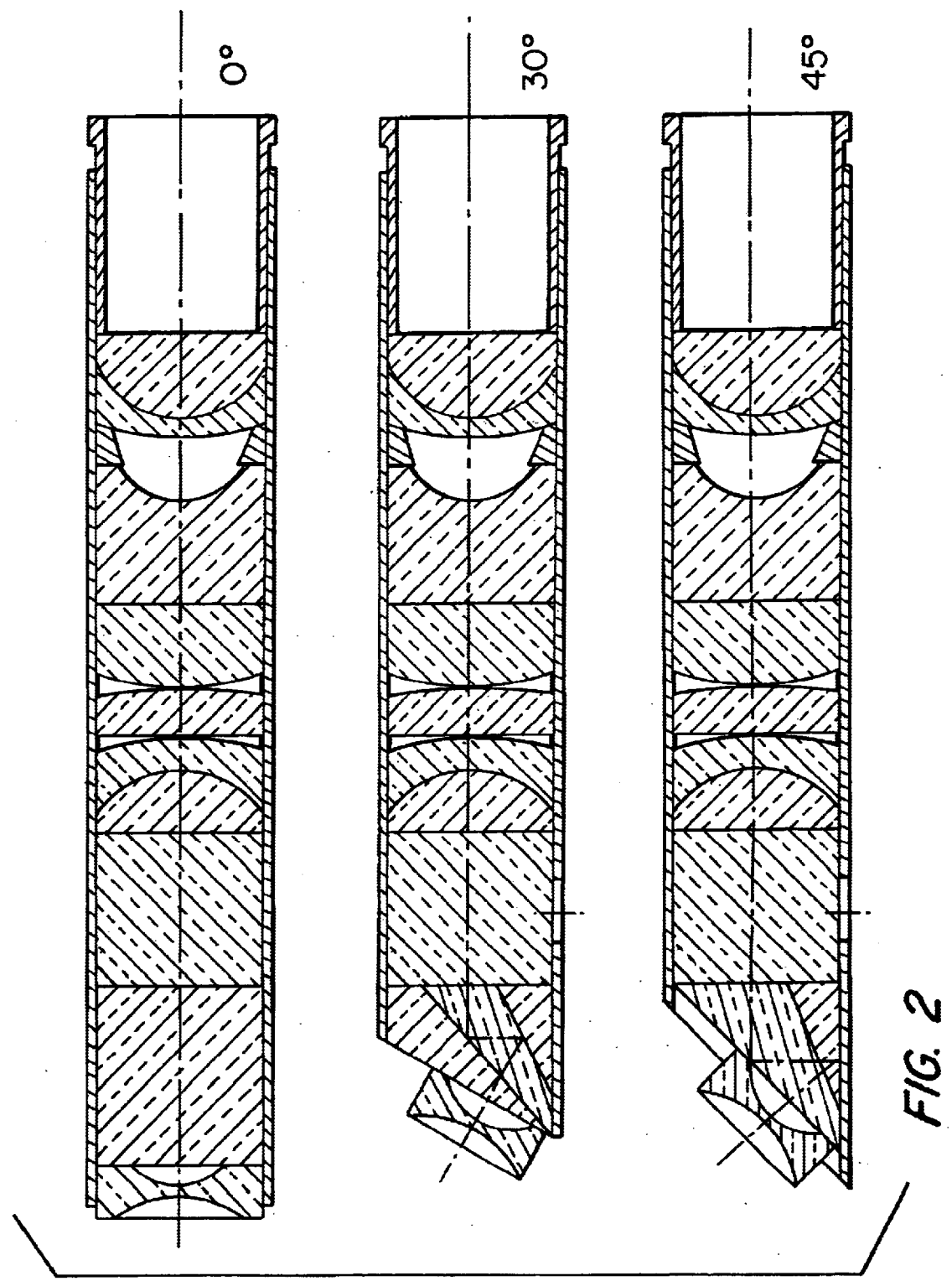
FIG. 2 The lens system according to FIG. 1b (without cover glass) in three modifications for various angles of deflection.

The plane-parallel plate, which is formed by surfaces 6 to 8 (models in FIGS. 1a and 1b) or surfaces 7 to 9 (models according to FIG. 1c), can also contain a bypass prism to alter the beam direction. Examples of diagonal-view endoscope lenses, which correspond to the model in FIG. 1b, are depicted in FIG. 2 for angles of deflection of zero degrees (as in FIG. 1b), 30 and 45 degrees. Here, instead of a plane-parallel plate, wedge-shaped prismatic elements are employed, which are equipped with reflected or total-reflecting surfaces in order to adjust the path of light to the desired angle of deflection.

Different material from that given in the tables can also be selected for the plane-parallel plate in order to adapt the lens system to a given length, or a corresponding vacant space could also be provided.

What is claimed is:

1. Endoscope lens with
    a first lens group in the beam direction having a negative total refractive power,
    an aperture diaphragm situated after the first lens group, and
    a second lens group having a positive total refractive power, situated after the aperture diaphragm,
    whereby the first lens group contains at least one lens with positive refractive power and at least one lens with negative refractive power,
    whereby one positive lens is arranged first in the beam direction, and
    whereby all lenses as optically effective surfaces have only spherical surfaces and are made only of material with homogenous refractive index, distinguished in that
    the negative lenses in the first lens group are plano-concave lenses.

2. Endoscope lens according to claim 1, distinguished in that the first lens group consists of two lenses, one of which has positive refractive power and the other has negative refractive power.

3. Endoscope lens according to claim 2, distinguished in that the positive lens in the first lens group is a biconvex lens.

4. Endoscope lens according to claim 2, distinguished in that the positive lens in the first lens group is a plano-convex lens.

5. Endoscope lens according to claim 3, distinguished in that the curvature of the image-side surface of the positive lens in the first lens group is greater than the curvature of the object-side surface.

6. Endoscope lens according to claim 2, distinguished in that the positive and the negative lenses in the first lens group are cemented to one another.

7. Endoscope lens according to claim 6, distinguished in that the positive lens has a greater refractive index than the negative lens.

8. Endoscope lens according to claim 2, distinguished in that the positive and the negative lenses in the first lens group have a small vacant space between them.

9. Endoscope
    with an endoscope lens,
    an eyepiece, and
    an image transmitting device, which conveys to the eyepiece the image received by the endoscope lens,
    whereby eyepiece and image transmitting device show no distortion or only a low level of distortion, distinguished in that
    the endoscope lens is constructed in accordance with claim 1.

10. Endoscope lens with
    a first lens group in the beam direction having a negative total refractive power,
    an aperture diaphragm situated after the first lens group, and
    a second lens group having a positive total refractive power, situated after the aperture diaphragm,
    whereby the first lens group contains at least one lens with positive refractive power and at least one lens with negative refractive power,
    whereby one positive lens is arranged first in the beam direction, and
    whereby all lenses as optically effective surfaces have only spherical surfaces and are made only of materials with homogenous refractive index, distinguished in that the negative lenses in the first lens group are biconcave or plano-concave lenses; and the second lens group has a plurality of cemented doublets.

11. Endoscope lens according to claim 10, distinguished in that the first lens group consists of two lenses, one of which has positive refractive power and the other has negative refractive power.

12. Endoscope lens according to claim 11, distinguished in that the positive lens in the first lens group is a biconvex lens.

13. Endoscope lens according to claim 11, distinguished in that the positive lens in the first lens group is a plano-convex lens.

14. Endoscope lens according to claim 12, distinguished in that the curvature of the image-side surface of the positive lens in the first lens group is greater than the curvature of the object-side surface.

15. Endoscope lens according to claim 11 distinguished in that the positive and the negative lenses in the first lens group are cemented to one another.

16. Endoscope lens according to claim 15, distinguished in that the positive lens has a greater refractive index that the negative lens.

17. Endoscope lens according to claim 11, distinguished in that the positive and the negative lenses in the first lens group have a small vacant space between them.

18. Endoscope with an endoscope lens, an eyepiece, and an image transmitting device, which conveys to the eyepiece the image received by the endoscope lens, whereby eyepiece and image transmitting device show no distortion or only a low level of distortion, distinguished in that the endoscope lens is constructed in accordance with claim 10.

* * * * *